US008619545B2

(12) United States Patent
Linkola et al.

(10) Patent No.: US 8,619,545 B2
(45) Date of Patent: Dec. 31, 2013

(54) SYSTEM AND METHOD FOR SELECTIVELY PROVISIONING TELECOMMUNICATIONS SERVICES BETWEEN AN ACCESS POINT AND A TELECOMMUNICATIONS NETWORK BASED ON LANDLINE TELEPHONE DETECTION

(75) Inventors: Janne P. Linkola, Espoo (FI); Christopher E. Caldwell, Woodstock, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 1067 days.

(21) Appl. No.: 12/175,405

(22) Filed: Jul. 17, 2008

(65) Prior Publication Data

US 2010/0014506 A1 Jan. 21, 2010

(51) Int. Cl.
*H04M 11/00* (2006.01)

(52) U.S. Cl.
USPC ........... 370/214; 370/241; 370/252; 370/401; 370/465

(58) Field of Classification Search
None
See application file for complete search history.

(56) References Cited

U.S. PATENT DOCUMENTS

| | | | |
|---|---|---|---|
| 4,998,271 A * | 3/1991 | Tortola et al. | 379/32.04 |
| 5,513,263 A | 4/1996 | White et al. | |
| 6,493,629 B1 | 12/2002 | Van Bosch | |
| 6,612,489 B2 | 9/2003 | McCormick et al. | |
| 6,615,035 B1 | 9/2003 | Lucidarme et al. | |
| 6,985,583 B1 | 1/2006 | Brainard et al. | |
| 7,110,545 B2 | 9/2006 | Furuya et al. | |
| 7,295,556 B2 | 11/2007 | Roese et al. | |
| 7,376,221 B1 * | 5/2008 | Remy et al. | 379/93.07 |
| 7,433,673 B1 | 10/2008 | Everson et al. | |
| 7,577,458 B2 | 8/2009 | Lin | |
| 7,610,062 B2 | 10/2009 | Beeman et al. | |
| 7,701,947 B2 | 4/2010 | Cunetto et al. | |
| 7,773,579 B1 * | 8/2010 | Liu et al. | 370/352 |
| 7,792,093 B2 | 9/2010 | Myhre et al. | |
| 7,843,903 B2 | 11/2010 | Bakke et al. | |
| 7,864,673 B2 | 1/2011 | Bonner | |

(Continued)

FOREIGN PATENT DOCUMENTS

| | | |
|---|---|---|
| CA | 2666472 | 8/2010 |
| EP | 1530321 A1 | 5/2005 |

(Continued)

OTHER PUBLICATIONS

U.S. Appl. No. 12/446,971, filed Apr. 23, 2009, System and Method for Managing Access Point Functionality and Configuration.

(Continued)

*Primary Examiner* — Andrew Chriss
*Assistant Examiner* — Salvador E Rivas
(74) *Attorney, Agent, or Firm* — Perkins Coie LLP

(57) ABSTRACT

A method and system for reducing network load by selectively provisioning connections between an access point and a carrier network is disclosed. The access point supports voice and data connections over an IP network. The access point includes a network connection and a telephone connector capable of connecting to a standard landline telephone. The access point also includes at least one detection component that detects whether a landline telephone is plugged in to the telephone connector. The access point is configured to provision a voice connection through the IP network when it detects that a landline telephone is plugged in.

25 Claims, 7 Drawing Sheets

(56) References Cited

U.S. PATENT DOCUMENTS

| | | | |
|---|---|---|---|
| 8,160,614 | B2 | 4/2012 | Shaffer |
| 8,320,344 | B2 | 11/2012 | Hodroj et al. |
| 2001/0030235 | A1 | 10/2001 | Hedemann et al. |
| 2001/0052006 | A1 | 12/2001 | Barker et al. |
| 2002/0147926 | A1 | 10/2002 | Pecen et al. |
| 2002/0188581 | A1 | 12/2002 | Fortin et al. |
| 2003/0119480 | A1 | 6/2003 | Mohammed |
| 2004/0078708 | A1 | 4/2004 | Li et al. |
| 2004/0133689 | A1 | 7/2004 | Vasisht |
| 2004/0192299 | A1 | 9/2004 | Wilson et al. |
| 2004/0203815 | A1* | 10/2004 | Shoemake et al. ............ 455/450 |
| 2005/0026650 | A1 | 2/2005 | Russell |
| 2005/0054342 | A1 | 3/2005 | Otsuka |
| 2005/0063542 | A1 | 3/2005 | Ryu |
| 2005/0078819 | A1* | 4/2005 | Hsu et al. ....................... 379/441 |
| 2005/0083911 | A1 | 4/2005 | Grabelsky et al. |
| 2005/0094592 | A1 | 5/2005 | Schmidt |
| 2005/0114504 | A1 | 5/2005 | Marolia et al. |
| 2005/0159149 | A1 | 7/2005 | Wen et al. |
| 2005/0160287 | A1 | 7/2005 | Mehta et al. |
| 2005/0174992 | A1* | 8/2005 | Files et al. .................... 370/352 |
| 2005/0181805 | A1 | 8/2005 | Gallagher |
| 2005/0243809 | A1 | 11/2005 | Best et al. |
| 2006/0075485 | A1 | 4/2006 | Funahashi et al. |
| 2006/0121941 | A1 | 6/2006 | Shiflett |
| 2006/0198361 | A1 | 9/2006 | Chen |
| 2006/0223498 | A1 | 10/2006 | Gallagher et al. |
| 2006/0256800 | A1* | 11/2006 | Harrington et al. ........... 370/401 |
| 2006/0293024 | A1 | 12/2006 | Benco et al. |
| 2006/0293038 | A1 | 12/2006 | Walter et al. |
| 2006/0293082 | A1 | 12/2006 | Neuhaus |
| 2007/0008885 | A1 | 1/2007 | Bonner |
| 2007/0026862 | A1 | 2/2007 | Hicks et al. |
| 2007/0049342 | A1 | 3/2007 | Mayer et al. |
| 2007/0079113 | A1 | 4/2007 | Kulkarni et al. |
| 2007/0115900 | A1 | 5/2007 | Liang et al. |
| 2007/0123231 | A1 | 5/2007 | Kim |
| 2007/0168553 | A1 | 7/2007 | Jones et al. |
| 2007/0177562 | A1 | 8/2007 | Castrogiovanni et al. |
| 2007/0195803 | A1 | 8/2007 | Lowery et al. |
| 2008/0020773 | A1 | 1/2008 | Black et al. |
| 2008/0046998 | A1 | 2/2008 | Cromer et al. |
| 2008/0095086 | A1 | 4/2008 | Linkola et al. |
| 2008/0151866 | A1 | 6/2008 | Wu |
| 2008/0160914 | A1 | 7/2008 | McRae et al. |
| 2008/0189550 | A1 | 8/2008 | Roundtree |
| 2008/0254833 | A1* | 10/2008 | Keevill et al. ................. 455/558 |
| 2008/0311917 | A1 | 12/2008 | Marathe et al. |
| 2009/0043876 | A1 | 2/2009 | Zhang et al. |
| 2009/0074187 | A1 | 3/2009 | Inoue et al. |
| 2009/0085760 | A1 | 4/2009 | Lee |
| 2009/0132675 | A1 | 5/2009 | Horn et al. |
| 2009/0154701 | A1 | 6/2009 | Kosaraju et al. |
| 2009/0163245 | A1 | 6/2009 | Oozeki |
| 2009/0215394 | A1 | 8/2009 | Dewan |
| 2009/0220216 | A1 | 9/2009 | Marsh et al. |
| 2010/0014507 | A1* | 1/2010 | Linkola et al. ................ 370/352 |
| 2010/0190492 | A1 | 7/2010 | Jiang |
| 2010/0235621 | A1 | 9/2010 | Winkler et al. |
| 2010/0265845 | A1 | 10/2010 | Lampen |
| 2011/0299686 | A1 | 12/2011 | Saboff et al. |
| 2012/0317224 | A1 | 12/2012 | Caldwell et al. |
| 2013/0083785 | A1 | 4/2013 | Hodroj et al. |

FOREIGN PATENT DOCUMENTS

| | | |
|---|---|---|
| EP | 1865656 A1 | 12/2007 |
| WO | WO-2004102941 A1 | 11/2004 |
| WO | WO-2006018047 A1 | 2/2006 |
| WO | WO-2006062907 A1 | 6/2006 |
| WO | WO-2006078430 A2 | 7/2006 |
| WO | WO-2006135285 A2 | 12/2006 |
| WO | WO-2007015075 A1 | 2/2007 |
| WO | WO-2008036938 A2 | 3/2008 |
| WO | WO-2010099229 | 9/2010 |

OTHER PUBLICATIONS

U.S. Appl. No. 12/401,550, filed Mar. 10, 2009, Method of Securely Pairing Devices With an Access Point for an IP-Based Wireless Network.

U.S. Appl. No. 12/175,414, filed Jul. 17, 2008, System and Method for Selectively Provisioning Telecommunications Services Between an Access Point and a Telecommunications Network Using a Subscriber Identifier.

"Vonage and Motorola Announce a Co-Branded Internet Telephone Adaptor with Wireless Router," PR Newswire (U.S.), Mar. 14, 2007, Copyright 2007 PR Newswire Association LLC, 2 pages.

Bertolucci, Jeff, "Vonage's flashy V-Portal offers easier VoIP setup," PC World, Apr. 1, 2008, Copyright 2008 PC World Communications, Inc., 1 page.

Dontronics, USB to RJ-11 VoIP Phone Adaptor, Apr. 19, 2006, <http://www.dontronics.com/phoneconnector.html>, 7 pages.

Greene, Tim, "Vonage tailors VoIP for small firms: Flat-fee dialing includes local, long-distance calls," Network World, Jun. 23, 2003, Copyright 2003 Network World, Inc., 2 pages.

Honan, Mathew, "I Am Here: One Man's Experience With the Location-Aware Lifestyle," Wired Magazine: 17.2 (pp. 1-7), <http://www.wired.com/gadgets/wireless/magazine/17-02/Ip_guineapig?currentPage=all> [date accessed Jan. 23, 2009].

International Search Report and Written Opinion for PCT/US2009/051072; Applicant: T-Mobile USA, Inc.; Mailing Date: Nov. 6, 2009, 12 pages.

IVT Corporation, *Bluetooth* PSTN Voice AP, Apr. 19, 2006, <http://www.ivtcorporation.com/products/ap/index.php>, 3 pages.

Lazarowitz, Elizabeth, "Easy Call: Phoning Via Web," New York Daily News, Feb. 5, 2007, Copyright 2007 Daily News, New York, 3 pages.

Shaw, Keith, "VoIP invades the home network," Network World, Aug. 30, 2004, Copyright 2004 Network World, Inc., 1 page.

Telco Systems: A BATM Company, Access200 Product Family Voice over IP Analog Telephone Adapters, Copyright 2005 Telco Systems, 2 pages.

International Search Report and Written Opinion for PCT/US2010/026715; Filed on Mar. 9, 2010, Applicant: T-Mobile USA, Inc., Mailed on Oct. 18, 2010, 10 pages.

European Patent Office, Supplementary European Search Report and Opinion, EP Patent Application 07854249, mailed Jun. 4, 2012, 6 pages.

International Searching Authority, International Search Report, PCT Application PCT/US2010/025271, mailed Dec. 28, 2010, 3 pages.

International Searching Authority, Written Opinion, PCT Application PCT/US2010/025271, mailed Dec. 28, 2010, 4 pages.

"AirStation One-Touch Secure System (AOSS)," White paper downloaded from www.buffalo-technology.com on May 27, 2009 bearing a date of Oct. 2004, Buffalo technology (USA), Inc., pp. 1-7.

"Frequently Asked Questions: Wi-Fi Protected Setup," Wi-Fi Alliance 2006, pp. 1-4.

"Wi-Fi Certified™ for Wi-Fi Protected Setup™: Easing the User Experience for Home and Small Office Wi-Fi® Networks," © 2007, 2008, 2009 Wi-Fi Alliance, 14 pages.

"Wi-Fi Protected Setup," Wi-Fi Alliance 2007, http:www.wi-fi.org/wifi-protected-setup/ [Accessed on Sep. 28, 2010], 2 pages.

Belkin International, Inc., "Belkin N1 Vision Wireless Router User Manual," Jul. 11, 2007, 117 pages.

Helander, Johannes et al., "Secure Web Services for Low-Cost Devices," Proceedings of the Eighth IEEE International Symposium on Object-Oriented Real-Time Distributed Computing (ISORC'05), May 18-20, 2005, pp. 130-139.

Houghton, Mike, "Cellular Modems: 3G Access on the Move," article downloaded from www.enterpriseplanet.com on May 27, 2009 bearing a date of May 25, 2006, Enterprise IT Planet, 4 pages.

IEEE-SA Standards Board, IEEE Std. 802.11, 1999 Edition, Reaffirmed 2003, 37 pages.

(56) References Cited

OTHER PUBLICATIONS

International Search Report and Written Opinion, International Application No. PCT/US2007/82010, Filed on Oct. 19, 2007, Applicant: T-Mobile USA, Inc., Date of Mailing: Jun. 16, 2008, 10 pages.
International Search Report and Written Opinion, International Application No. PCT/US2007/82010, Filed on Oct. 19, 2007, Applicant: T-Mobile USA, Inc., Date of Mailing: Jun. 18, 2008, 10 pages.
International Search Report and Written Opinion, International Application No. PCT/US2007/82285, Filed on Oct. 23, 2007, Applicant: T-Mobile USA, Inc., Date of Mailing: Mar. 10, 2008, 10 pages.
N1 Wireless Router User Manual, Belkin International, Inc., 2007, 104 pages.

* cited by examiner

SYSTEM AND METHOD FOR SELECTIVELY PROVISIONING TELECOMMUNICATIONS SERVICES BETWEEN AN ACCESS POINT AND A TELECOMMUNICATIONS NETWORK BASED ON LANDLINE TELEPHONE DETECTION

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP ("VoIP") services, as well as various data services, that utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards) for at least part of their infrastructure. Likewise, device manufacturers are producing a new generation of mobile devices such as wireless handhelds, wireless handsets, mobile phones, personal digital assistants, notebook computers, and similar devices. These devices are enabled to send and receive information using IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunication systems. UMA technology has been accepted into Release 6 of the 3rd Generation Partnership Project (3GPP) and is also referred to as Generic Access Network (GAN) technology. In various implementation schemes, UMA allows wireless service providers to merge cellular networks (such as Global System for Mobile Communications (GSM) networks) and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN, or similar technology. A call or other communication may be tunneled to the Mobile Switching Center (MSC) of a mobile service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

DETAILED DESCRIPTION

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Sample Network Configurations

Figure 1:
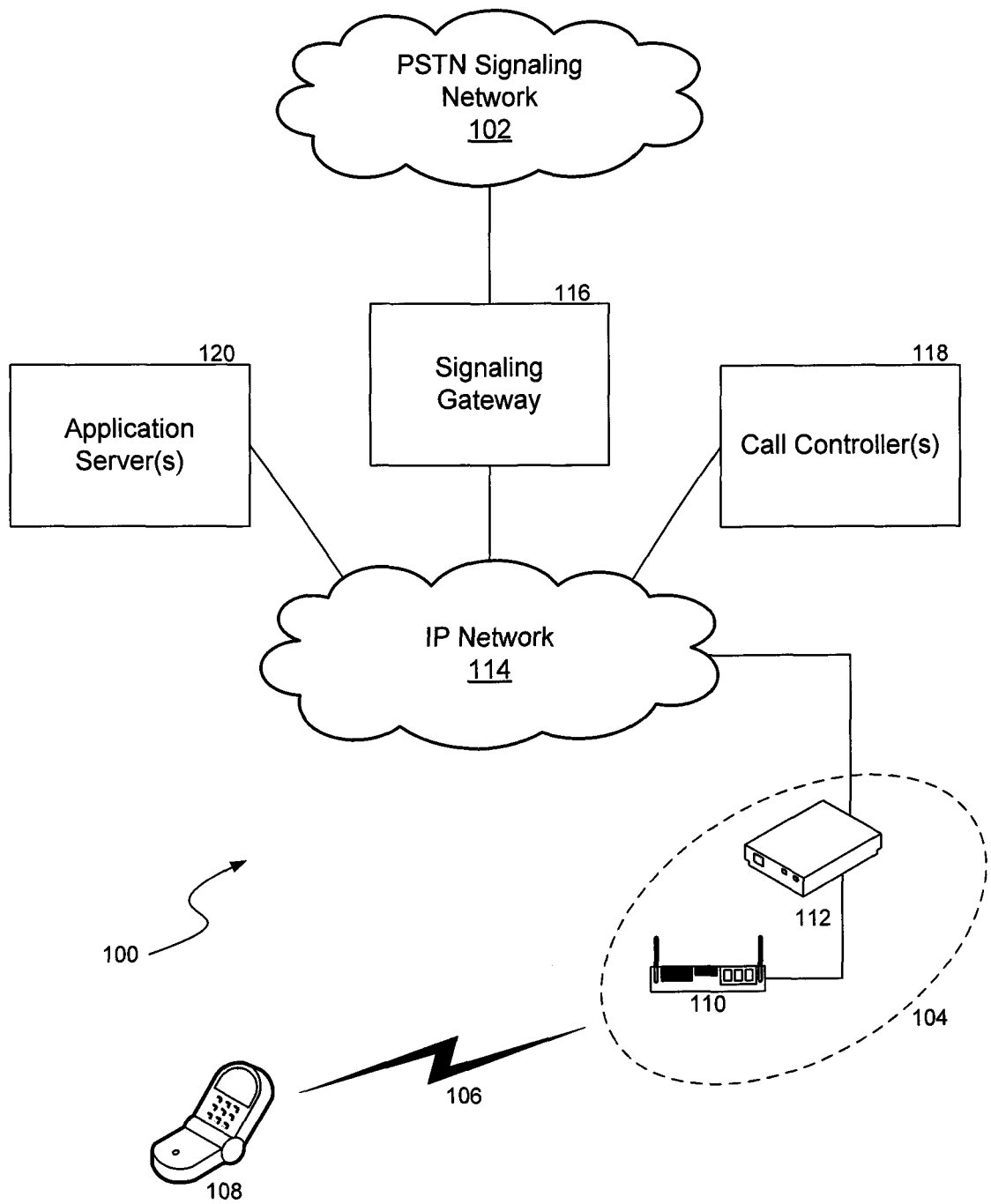
FIG. 1 illustrates aspects of a sample network system that allows IP-based communications in conjunction with a public switched telephone network (PSTN).

FIG. 1 illustrates aspects of a sample network system 100 that allows VoIP-based communications in conjunction with a public switched telephone network (PSTN) 102. The system 100 includes at least one wireless access point 104. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured telecommunications device 108 (e.g., a VoIP device). Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 104 includes a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the telecommunications device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In this example, a telecommunication service provider manages both the call controller 118 and the application server 120.

Figure 2:
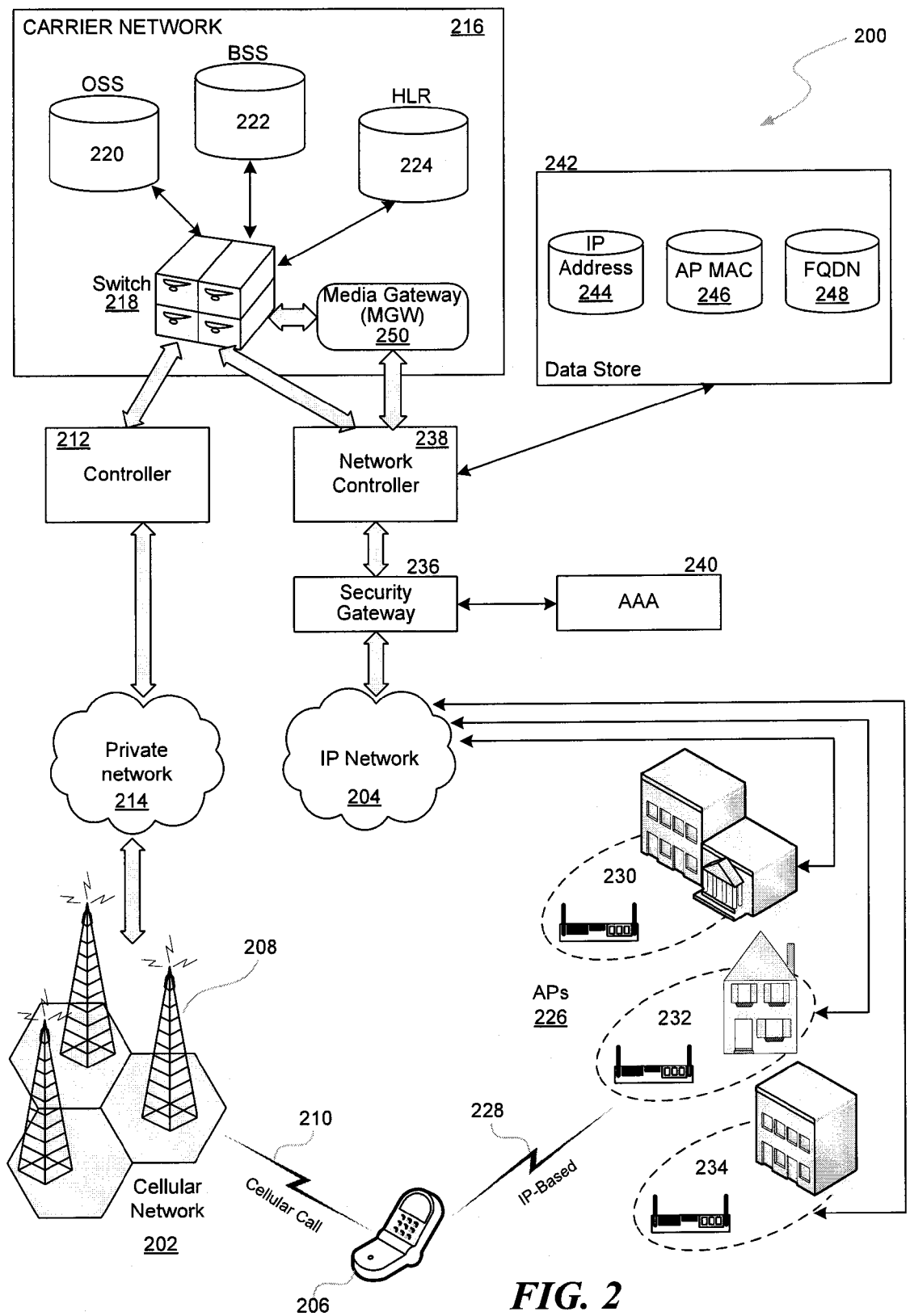
FIG. 2 illustrates an example converged wireless network system that combines a cellular network with an IP-based wireless telecommunications network.

FIG. 2 illustrates a sample network system 200 in which aspects of the access point management facility can be implemented within a cellular telephone-type network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based wireless telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type configuration that provides service to the user of a mobile device 206. Such service may include voice services, and also supplementary services such as call forwarding and call waiting, text messaging services (e.g., SMS), and data-based services like ring tone downloads, game downloads, picture messaging, email and web browsing. Further, since the mobile device 206 is connected to an IP network, all manner of data services available over such networks may be provided to the mobile device 206.

In general, the described network system 200 accepts registration requests from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a switch (e.g., a mobile switching center or MSC) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Each access point 226 is coupled to the IP network 204 through, for example, a broadband connection (not shown) such as a DSL (Digital Subscriber Line) modem, a cable modem, a satellite modem, or any other broadband device. In addition, as discussed in detail below, the access points 226 may be configured with one or more landline telephone connectors suitable for connecting a landline telephone to the IP network 204. (The landline telephone can take many known forms, including a cordless telephone system.)

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 236. In contrast to non-IP communication requests, such transmissions bypass the cellular telephone system's 202 existing network of radio towers. The security gateway 236 controls access to a network controller 238, which communicates with a data store 242 for logging and accessing communications data. Thus, one function of the network controller 238 is to manage access to the carrier network 216 when dealing with an IP-based communication (in a similar manner to that performed by the base station controller 212 for a non-IP-based communication).

In one example, authentication of a request for access by the mobile device 206 over the IP network 204 is handled by the security gateway 236, which communicates with an authentication, access and authorization (AAA) module 240 that is most likely associated with the carrier network 216. Challenges and responses to requests for access by the mobile device 206 are communicated between the HLR 224 and the AAA module 240. When authorization is granted, the security gateway 236 communicates the assignment of an IP address to the mobile device 206 that requested access. Once the security gateway 236 passes the IP address to the mobile device 206, the public IP address assigned to the mobile device 206 is passed to the network controller 238.

In another authorization example, upon receiving an identifier from the mobile device 206, the network controller 238 may query the data store 242 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (IMSI)), an Internet Protocol (IP) address (or "Public IP address") associated with the access point, a fully qualified domain name (FQDN), or other similar types of information. The data store 242 may be a single database, table, or list, or a combination of databases, tables, or lists, such as one for IP addresses 244, one of MAC addresses 246, and one for FQDNs 248. The data store 242 may include "blocked" identifiers as well as "authorized" identifiers. Authorized accesses to the IP-based wireless telecommunications network may be maintained by the network controller 238 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 238 to the switch 218, while the voice bearer portion of the communication (e.g., the portion of the communication that contains the actual content (either data or voice information) of the communication) is routed through the network controller 238 to a media gateway 250. In other words, the media gateway 250 controls the content flow between the service provider and the mobile device 206, while the switch 218 controls the signaling flow (or controls overhead-related flow) between the service provider and the mobile device 216.

Figure 3:
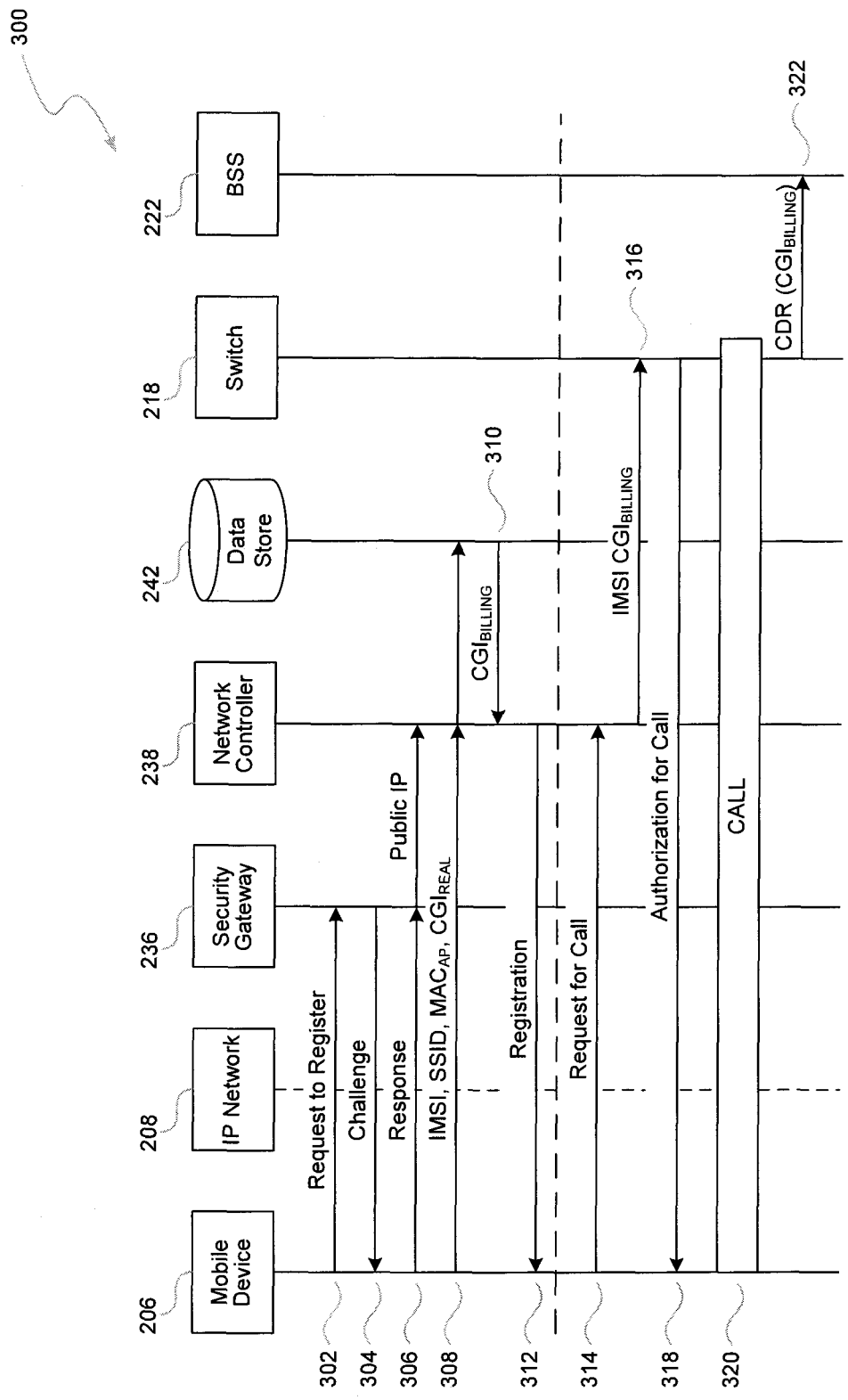
FIG. 3 illustrates a timing diagram of actions in a UMA network for provisioning a connection.

FIG. 3 illustrates an example of a timing diagram 300 of steps in a UMA network for provisioning telecommunications services, including registering a mobile device 206 and facilitating a call from the mobile device 206. However, as noted herein, the disclosed system is not limited to UMA services and may include any other service suitable for providing telecommunications services. For example, the disclosed system may also be configured to provide access using licensed frequency bands. The call registration process is illustrated by communication steps 302-312, while the calling process is illustrated by communication steps 314-322.

At step 302, mobile device 206 initiates a call by sending a request to register to the security gateway 236. The security gateway 236 replies with an authentication challenge communicated back to the mobile device 206 at step 304. At step 306, the mobile device 206 responds to the authentication challenge with a response communicated to security gateway 236. Also at step 306, the security gateway 236 communicates a public IP address assigned to the access point 226 to the network controller 238. The mobile device 206 also communicates the IMSI ID and a Cell Global Identifier (CGI) record ($CGI_{REAL}$) to the security gateway 236. The CGI record is an identifier in a GSM network that uniquely identifies a base station initiating a call through the core network. In a UMA connection, $CGI_{REAL}$ is the CGI record for the nearest base station 208. At step 308, the security gateway 236 transmits the IMSI ID, $CGI_{REAL}$ along with the SSI and MAC address ($MAC_{AP}$) from the access point 226 to the network controller 238. Network controller 238 communicates with database 242 at step 308, which replies with $CGI_{BILLING}$ at step 310. $CGI_{BILLING}$ is used by the UMA network to ensure that the call is billed correctly. At step 312, network controller 238 communicates a registration completion message to the mobile device 206.

Once the registration is completed, mobile device 206 communicates with network controller 238 to request a call at step 314. At step 316, the network controller 238 communicates the IMSI ID and $CGI_{BILLING}$ to switch 218. Switch 218 authorizes the call at step 318 such that the mobile device 206 can communicate over a communication channel established through switch 218 at step 320. At step 322, the call is terminated and switch 218 communicates a call data record (CDR) to the billing system (i.e. the BSS 222).

Figure 4:
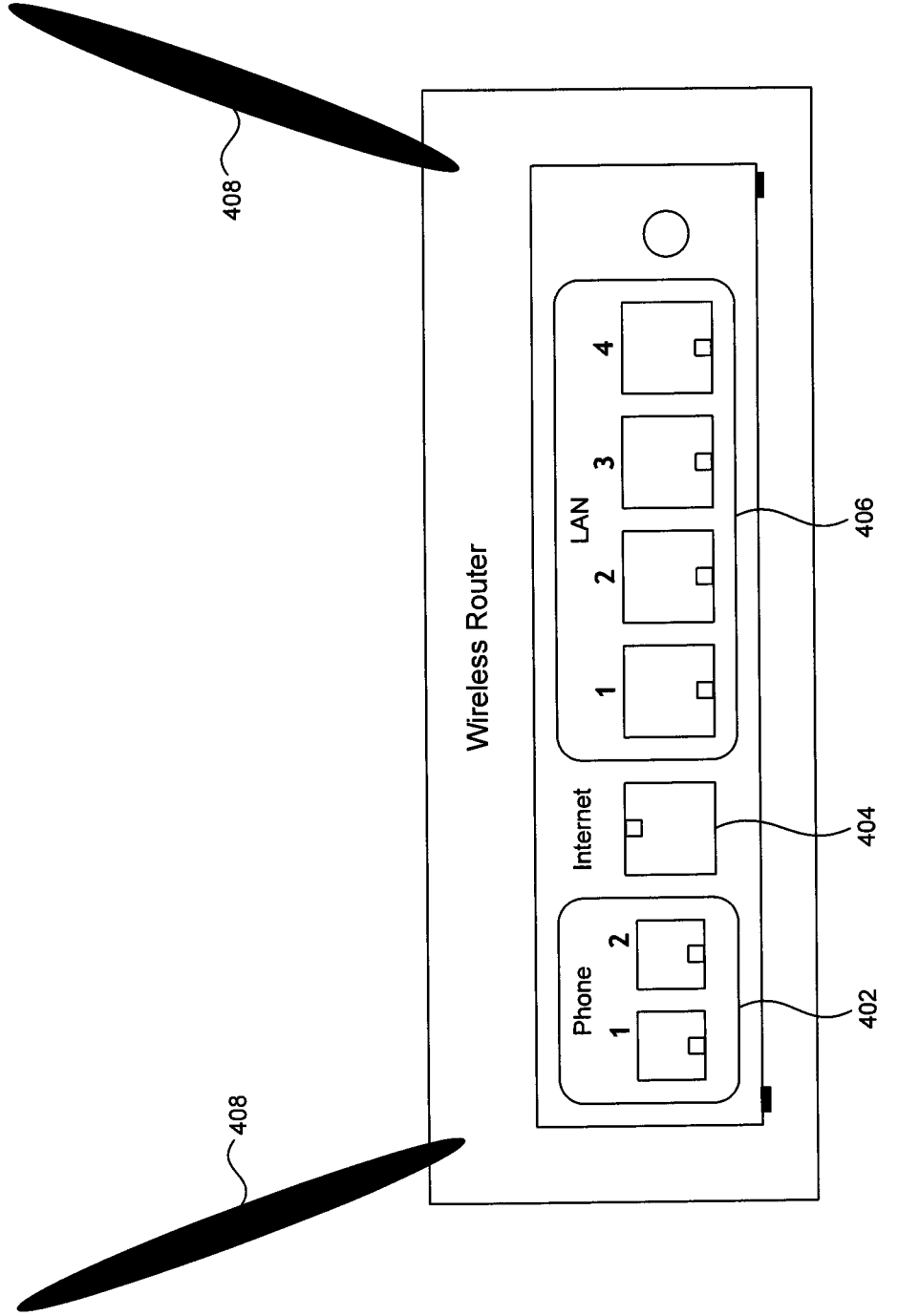
FIG. 4 illustrates the back panel of an access point capable of supporting two landline telephones in addition to a wireless connection.

Although FIGS. 1 and 2 illustrate a mobile phone connected to the access point through a wireless connection, IP-based telecommunications systems are not so limited. For example, FIG. 4 illustrates the back panel of an access point 226 capable of supporting two landline telephones in addition to a wireless connection. The access point 226 includes a WAN connector 404, which connects the access point 226 to the IP network 204. The access point 230 also includes a plurality of data connectors 406 that connect to computers or other devices and are used to carry data traffic. The access point 226 has one or more antennas 408 that support wireless connections for data transmission, such as for an IP-based telecommunications connection. Finally, the access point 226 includes two telephone connectors 402, which can accept a cable connecting to a landline telephone. In most cases, this is implemented as a RJ-11 connector, but one skilled in the art will appreciate that other standard connectors could be used, including a RJ-14 or RJ-25 connector. In a configuration supporting a landline connection, the wireless connection 228 shown in FIG. 2 instead is implemented as a wired connection between telephone and access point. In this configuration, the access point 226 converts the incoming analog voice signal into digital form and encapsulates the signal for transmission over the IP network 204. The access point 226 also communicates with the security gateway 236 or the network controller 238 to authorize the landline telephone to use the UMA connection.

In some configurations, the access point 226 includes components to provide the connected landline telephone with a simulation of a Plain Old Telephone Service (POTS) network. For example, the access point 226 may act as a POTS end office by providing a dial tone when the user lifts the telephone off the hook if there is a connection to the carrier network. The access point may also provide calling name and number for incoming calls by translating the data from the IP-based telecommunications format to the format used by a POTS caller ID service. It may similarly provide the ability to toggle between calls for call waiting using the standard flash hook by translating the POTS signal into the equivalent UMA format. The access point 226 may also provide a standard POTS stutter dial tone to indicate new voice mail. The access point 226 could do this by periodically querying the carrier network 216 to determine if new voice mail is available and providing the stutter dial tone if the carrier network indicates that there is new voice mail. In addition to the stutter tone, the access point 226 may include an indicator (e.g. a flashing light) to notify the user that new voice mail is available.

II. Selectively Provisioning Connections between the Access Point and the Network A method and system for reducing network load by selectively provisioning connections between an access point and the carrier network is disclosed. One advantage of providing an IP-based telecommunications connection for a landline telephone is that it allows customers to pay a single bill for all telephone services. In addition, a landline telephone may be easier and more ergonomic for customers to use at home because such telephones do not have to be as compact as a mobile device. Also, customers may prefer to use a landline telephone because they do not have to worry about draining the battery, as they would with a mobile phone. However, a problem that arises when the access point 226 supports connections from a landline telephone is that it is less clear when the connection needs to be provisioned. As discussed above for FIGS. 1-3, every connection between a user and the carrier network uses some resources. The resources are reserved (and thus inaccessible for others) even if the connection is not currently in use. Thus, it is desirable that the system reserve resources only when they are needed. For a wireless connection, the access point 226 can simply be configured to provision a connection only when the mobile device 206 connects and end the connection when the telephone disconnects. The access point 226 does not waste resources by maintaining the connection when the mobile device 206 is not present. However, the landline connector is always present, even if a landline telephone is not connected to it. It would be a waste of resources to provision a connection that will not be used.

Figure 5A:
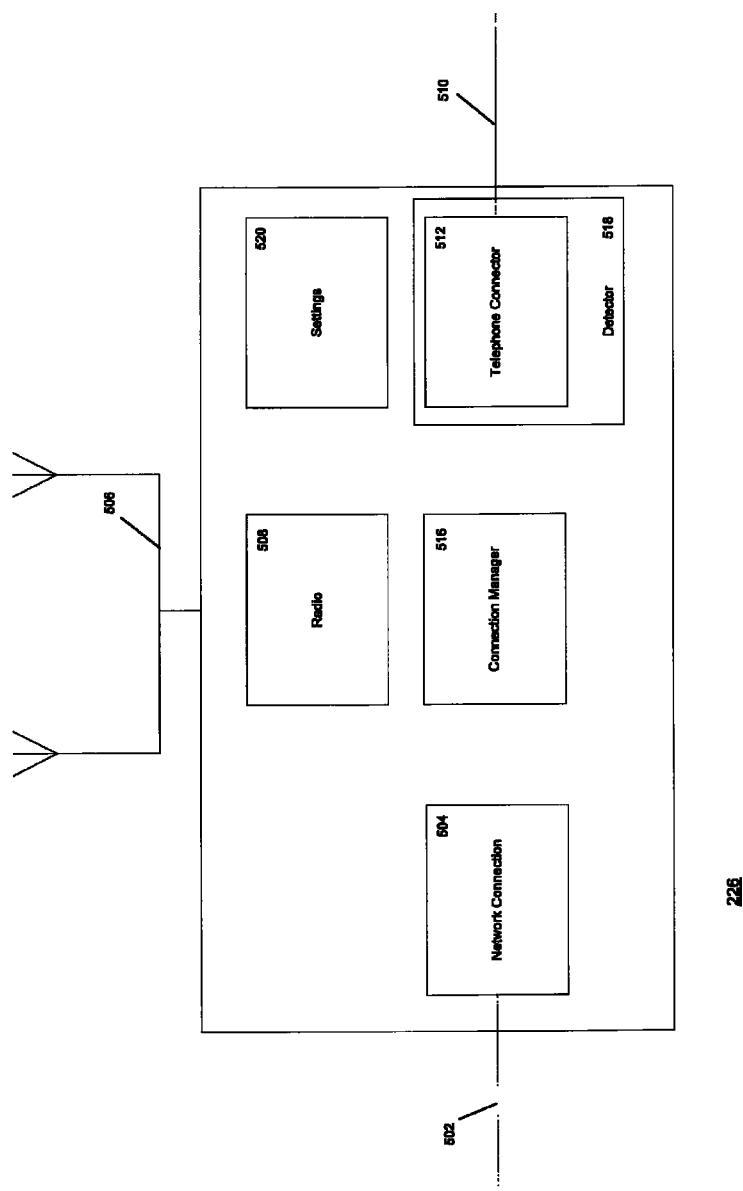
FIG. 5A illustrates a block diagram of an access point capable of selectively provisioning a connection based on various detection functions.

FIG. 5A illustrates a block diagram of an access point 226 capable of selectively provisioning a connection based on various detection functions. The access point 226 includes a network connection component 504 that provides an interface between the access point 226 and the IP network 204. The network connection component 504 is connected to the network through a network cable 502. The network connection component 504 may be any type known in the art, such as an Ethernet network chip. The connection is supported by a standard network protocol stack, such as a TCP/IP stack (not shown). Similarly, the access point 226 includes a telephone connector component 512, which is connected to a telephone cord 510. The telephone connector component receives a landline telephone signal through the telephone cord 510 and passes it to other processing components (not shown). The other processing components include, for example, a component to convert the analog signal into a digital form and encapsulate the data for transmission. The access point 226 may also have a wireless LAN (WLAN) radio component 508, which is connected to one or more antennas 506. The WLAN radio component 508 provides wireless networking support to enable mobile devices 206 to connect as described above. The access point 226 may include other radio components instead of, or in addition to, the WLAN radio component 508. For example, the access point 226 may include radio components capable of operating in licensed frequency bands using wireless standards such as GSM or CDMA2000. The access point 226 may also include radio components capable of operating in unlicensed frequency bands using other wireless standards, such as UWB. The access point 226 also includes a settings component 520, which stores configuration settings for the access point 226, such as security settings and the IP address of the security gateway 238.

The access point also has a connection manager component 516. The connection manager component 516 provisions call connections between the access point 226 and the carrier network 216 when the access point 226 determines that the connection should be set up. The connection manager 516 executes the call setup steps described above for FIGS. 1-3, such as contacting the security gateway 236.

Figure 5B:
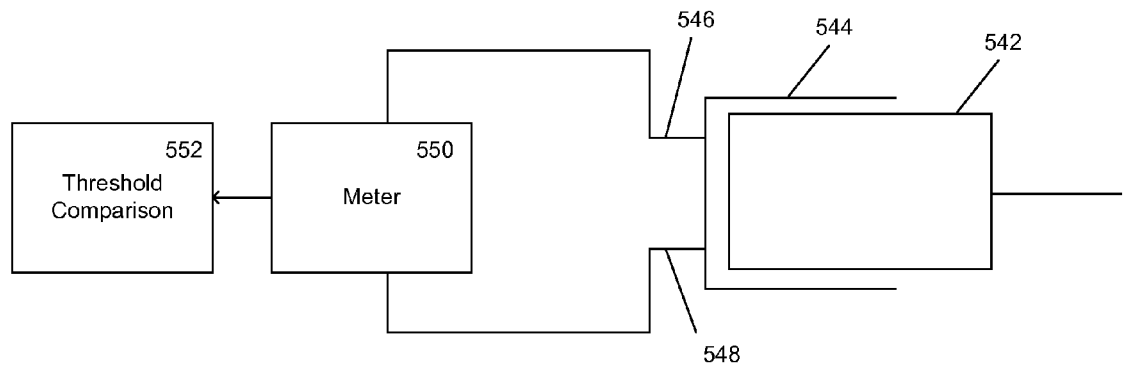
FIG. 5B illustrates a circuit suitable for using electrical characteristics to detect that a telephone is connected.

The telephone connector component 512 is associated with a detection component 518, which determines if a landline telephone is connected to the telephone connector component 512. The detection component 518 may use any method known in the art to detect the landline telephone. For example, FIG. 5B illustrates a circuit 540 suitable for using electrical characteristics to detect that a landline telephone is connected. Two wires, 546 and 548, are electrically connected to a telephone jack 544. The telephone jack 544 may be, for example, an RJ-11 jack. The wires 546 and 548 are connected so that when a telephone plug 542 is inserted into the telephone jack 544, an electrical circuit is formed connecting wire 546 to wire 548. The wires 546 and 548 are connected to a meter 550, which is configured to measure the resistance, capacitance, inductance, or other impedance in the circuit including wires 546 and 548. If nothing is plugged in to the telephone jack 544, the meter 550 will detect an infinite resistance (or alternatively, a high capacitance). If a telephone is plugged in, the meter 550 will detect a measurable resistance (or a much smaller capacitance). The meter 550 provides the measured value to a threshold comparison component 552, which compares the measured value to a threshold value. The threshold comparison component 552 then determines that a telephone plug 542 is inserted when the measured value crosses the threshold value. The threshold comparison component 552 can be configured with thresholds that are determined theoretically or experimentally. Of course, the circuit 540 can also be configured to use a combination of resistance, capacitance, inductance, or other impedance to detect the telephone plug 542.

Figure 5C:
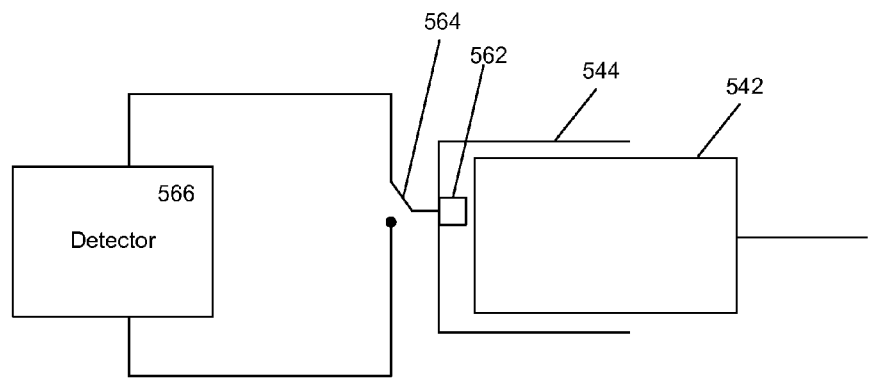
FIG. 5C illustrates a circuit suitable for using mechanical characteristics to detect that a telephone is connected.

Alternatively, FIG. 5C illustrates a circuit 560 suitable for using mechanical characteristics to detect that a telephone is connected. The telephone jack 544 includes a button 562 or similar mechanical component connected to a mechanical or electromechanical switch 564. The switch 564 is connected to the terminals of a detector 566. When there is no telephone plug 542 present, the switch 564 is open and no current can flow between the terminals of the detector 566. When a telephone plug 542 is inserted, it presses the button 562, closing the switch 564 and creating a closed circuit between the terminals. Thus, the detector 566 determines that the telephone plug 542 is inserted when the circuit is closed. In one example, the system is configured so switch 564 closes when the locking tab on the RJ-11 connector is engaged with the connector.

Figure 6:
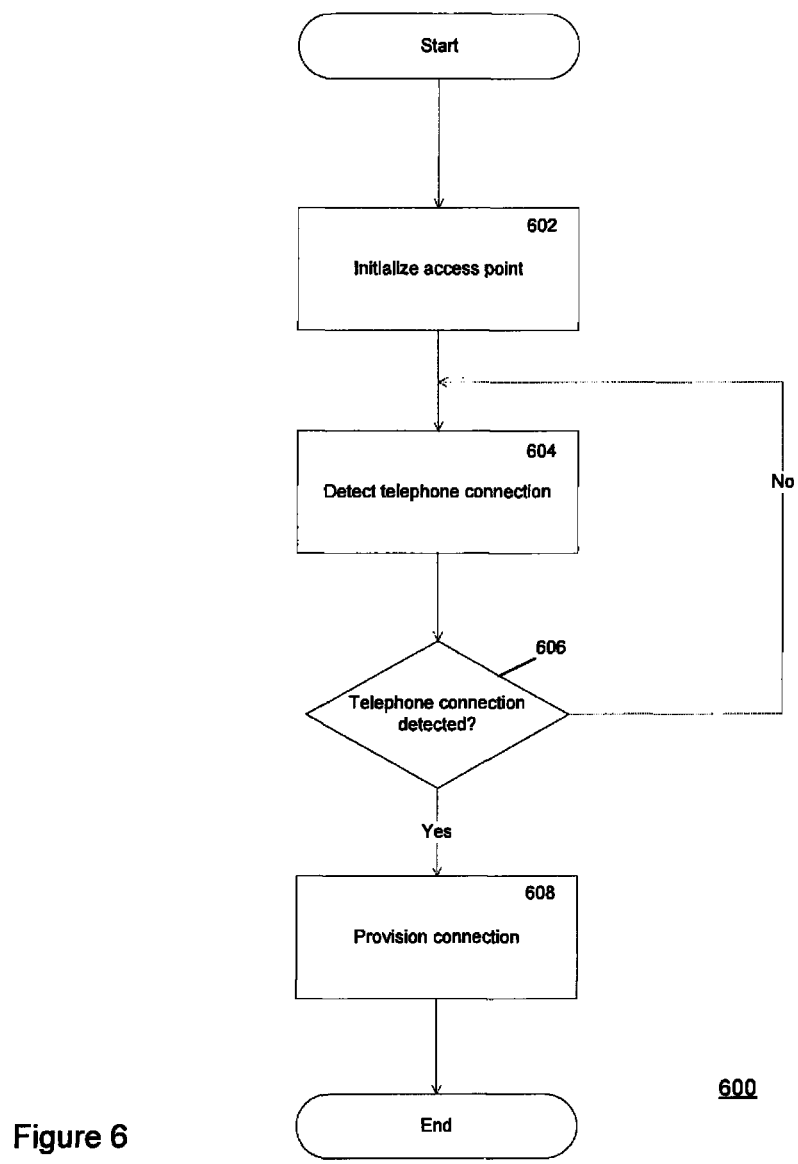
FIG. 6 illustrates a process for selectively provisioning a connection between a landline telephone and an IP-based network

The connection manager component 516 uses data from these components to selectively provision a connection with the carrier network. FIG. 6 illustrates a process 600 for selectively provisioning a connection between a landline telephone and an IP-based network. The process begins at block 602, where the access point starts up and initializes. During this step, the access point 226 executes initialization tasks, such as starting the radio component 508 to provide wireless networking and the data connectors 406 to provide wired data networking. Once the access point 226 is running, the system proceeds to block 604, where it attempts to detect a landline telephone connection using any method known in the art, such as the methods discussed above. The system then proceeds to decision block 606, where the system selects a processing branch depending on whether the detection component 518 found a landline telephone connection. If a telephone connection was detected, the system proceeds to block 608, where the connection manager component 516 provisions the connection for the landline telephone. If a telephone connection was not detected, the system returns to block 604, where it again attempts to detect a landline telephone connection.

The system may, for example, be configured to loop at a specified interval, such as every 3 seconds, to detect whether a telephone has been plugged in to the telephone connector 512. Alternatively, the detection component 518 may be configured to act as an interrupt by sending a notification signal to the connection manager component automatically when it detects that a telephone is connected. In this example, the connection manager component 516 is configured to provision a connection in response to the interrupt signal. Additionally, the system may be configured to only check for a landline telephone at startup time, in which case the loop terminates after the first check.

As shown in FIG. 4, the access point 226 may have two or more telephone connectors 402. In this configuration, the access point 226 provisions connections for each connector separately. Thus, the access point 226 executes the detection and provisioning steps of the method of FIG. 6 independently for each connector.

III. Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A wireless local area network (WLAN) access point configured for facilitating IP-based communications with a telecommunications system, the system comprising:
   an antenna;
   a WLAN radio connected to the antenna and configured to provide WLAN connectivity;
   a network connection component configured to communicate with an IP-based network and connected to transmit and receive data received from the WLAN radio;
   a telephone connector component configured to accept a wired connection with a landline telephone;
   a detection component connected to the telephone connector component and configured to detect whether a landline telephone is connected to the telephone connector component,
      wherein the detecting includes detecting a physical connection between the access point and a landline telephone line to permit telecommunication services to be provided through the landline telephone line to the landline-type telephone; and
   a connection manager configured to provision telecommunications services between the telephone connector component and the IP-based network in response to the detection component detecting that a landline telephone is physically connected to the telephone connector component,
      wherein provisioning comprises registering with a cellular telephone carrier network and receiving a resource allocation from the cellular telephone carrier network, and
      wherein telecommunications services are not provisioned between the telephone connector component and the IP-based network if the detection component detects an open circuit at the telephone connector component, corresponding to the landline telephone being not physically connected to the telephone connector component.

2. The WLAN access point of claim 1, wherein the detection component comprises a mechanical or electromechanical switch that is enabled when a locking tab of a plug is engaged with the telephone connector component.

3. The WLAN access point of claim 1, wherein the detection component comprises a mechanical or electromechanical switch to detect whether the landline telephone is connected.

4. The WLAN access point of claim 1, wherein the detection component uses electrical characteristics of the telephone connector component to detect the landline telephone, the electrical characteristics comprising one or more of the following: resistance, capacitance, or inductance.

5. The WLAN access point of claim 1, wherein the detection component is configured to generate an interrupt signal when a landline telephone connection is detected and wherein the connection manager is configured to provision the telecommunications services in response to the interrupt signal.

6. The WLAN access point of claim 1, wherein the telecommunications services are UMA services.

7. A method of provisioning telecommunications services through an access point, the access point being suitable for use as an access point to an IP-based wireless telecommunications network to interface with a landline telephone, the method comprising:
determining whether a landline-type telephone is connected to the access point,
wherein the determining includes detecting a physical connection between the access point and a landline telephone line to permit telecommunication services to be provided through the landline telephone line to the landline-type telephone; and
in response to determining that the landline telephone is physically connected, provisioning telecommunications services between the landline telephone and the IP-based wireless telecommunications network,
wherein telecommunications services are not provisioned between the telephone connector component and the IP-based network if the detection component detects an open circuit at the telephone connector component, corresponding to the landline telephone being not physically connected to the telephone connector component.

8. The method of claim 7, wherein provisioning includes provisioning a voice connection and comprises registering with a carrier network and receiving a resource allocation from the carrier network, such that after provisioning is complete voice calls are permitted via the IP-based wireless telecommunications network.

9. The method of claim 7, wherein determining comprises using mechanical characteristics to detect the landline telephone.

10. The method of claim 7, wherein determining comprises using electrical characteristics to detect the landline telephone.

11. The method of claim 7, further comprising:
in response to determining that a landline telephone is not present, waiting a predetermined time period; and
repeating determining after the predetermined time period has passed.

12. The method of claim 7, wherein provisioning includes provisioning a voice connection and comprises registering with a carrier network and receiving a resource allocation from the carrier network, such that after provisioning is complete voice calls are permitted via the IP-based wireless telecommunications network and further comprising:
generating an interrupt signal in response to a landline telephone being connected; and
provisioning the telecommunications services in response to the interrupt signal.

13. The method of claim 7, wherein determining is executed during an initialization process of the access point.

14. A system for managing use of an access point configured for facilitating IP-based communications in a telecommunications system, the system comprising:
a telephone connector component configured to accept a connection with a landline telephone device;
a network connection component configured to communicate with an IP-based network;
a detection component connected to the telephone connector component and configured to detect whether a landline telephone device is connected to the telephone connector component,
wherein the detecting includes detecting a physical connection between the access point and a landline telephone line to permit telecommunication services to be provided through the landline telephone line to the landline-type telephone; and
a connection manager configured to provision telecommunications services between the telephone connector component and the IP-based network in response to the detection component detecting that at least a landline telephone device is physically connected to the telephone connector component,
wherein telecommunications services are not provisioned between the telephone connector component and the IP-based network if the detection component detects an open circuit at the telephone connector component, corresponding to the landline telephone being not physically connected to the telephone connector component.

15. The system of claim 14, further comprising multiple telephone connector components, wherein the detection component is configured to independently detect whether a landline telephone device is connected to any of the multiple telephone connector components and the connection manager is configured to independently provision communications connections between the IP-based network and individual ones of the multiple telephone connector components.

16. The system of claim 14, wherein the detection component uses the impedance of the telephone connector component to detect whether the landline telephone is connected.

17. The system of claim 14, further comprising a radio component configured to provide telecommunications services using a licensed frequency band.

18. The system of claim 14, further comprising a radio component configured to provide telecommunications services using an unlicensed frequency band.

19. A system for managing use of an access point configured for facilitating IP-based communications in a telecommunications system, the system comprising:
a network connection component for connecting to an IP-based network;
a telephone connection means for connecting to a landline telephone;
a means for determining whether a landline telephone is connected to the telephone connection means,
wherein the determining includes detecting a physical connection between the access point and a landline telephone line to permit telecommunication services to be provided through the landline telephone line to the landline-type telephone;
a means for provisioning telecommunications services between the telephone connector and the IP-based network in response to determining that the landline telephone is physically connected to the telephone connection means,
wherein telecommunications services are not provisioned between the telephone connector component and the IP-based network if the detection component detects an open circuit at the telephone connector component, corresponding to the landline telephone being not physically connected to the telephone connector component.

20. The system of claim 19, wherein the means for determining uses mechanical characteristics of the telephone connection means to detect the landline telephone.

21. The system of claim 19, wherein the means for determining uses electrical characteristics of the telephone connection means to detect the landline telephone, the electrical characteristics comprising one or more of the following: resistance, capacitance, or inductance.

22. The system of claim 19, wherein the means for determining is configured to generate an interrupt signal when a landline telephone connection is detected and wherein the means for provisioning is configured to provision the communications connection in response to the interrupt signal.

23. The system of claim 19, wherein the means for determining is configured to periodically attempt to determine whether the landline telephone is connected to the telephone connection means.

24. The system of claim 19, further comprising a radio component configured to provide telecommunications services using a licensed frequency band.

25. The system of claim 19, further comprising a radio component configured to provide telecommunications services using an unlicensed frequency band.

* * * * *